United States Patent [19]

Araya et al.

[11] Patent Number: 4,581,212

[45] Date of Patent: * Apr. 8, 1986

[54] ZEOLITE EU-7

[75] Inventors: Abraham Araya, Merseyside, England; Barrie M. Lowe, Edinburgh, Scotland

[73] Assignee: Imperial Chemical Industries PLC, London, England

[*] Notice: The portion of the term of this patent subsequent to Apr. 8, 2003 has been disclaimed.

[21] Appl. No.: 538,434

[22] Filed: Oct. 3, 1983

[30] Foreign Application Priority Data

Oct. 1, 1982 [GB] United Kingdom ............... 8228048

[51] Int. Cl.$^4$ .............................................. C01B 33/28
[52] U.S. Cl. .................................... 423/277; 423/326; 423/328; 423/329; 502/62; 502/77
[58] Field of Search ........................... 423/326–333; 502/60, 77, 62

[56] References Cited

U.S. PATENT DOCUMENTS

| | | | |
|---|---|---|---|
| 4,139,600 | 2/1979 | Rollmann et al. | 423/329 |
| 4,296,083 | 10/1981 | Rollmann | 423/329 |
| 4,397,825 | 8/1983 | Whittam | 423/328 |

FOREIGN PATENT DOCUMENTS

| | | | |
|---|---|---|---|
| 0042225 | 12/1981 | European Pat. Off. | 423/329 |
| 0049386 | 4/1982 | European Pat. Off. | 423/329 |
| 2071632 | 9/1981 | United Kingdom | 423/328 |

Primary Examiner—Edward J. Meros
Attorney, Agent, or Firm—Cushman, Darby & Cushman

[57] ABSTRACT

A new zeolite material designated EU-7 has a molar composition expressed by the formula:

0.5 to 2.5 $R_2O:Y_2O_3$: at least 20 $XO_2$: 0 to 600 $H_2O$ wherein R is a monovalent cation or 1/n of a cation of valency n, X is silicon and/or germanium, Y is one or more of aluminum, iron, chromium, vanadium, molybdenum, arsenic, antimony, manganese, gallium or boron and $H_2O$ is water of hydration additional to water notionally present when R is H, and having an X-ray powder diffraction pattern substantially as set out in Table 1. The zeolite material is prepared from a reaction mixture containing $XO_2$ (preferably silica), $Y_2O_3$ (preferably alumina) and optionally an organic compound, most preferably butane-1,4-diamine.

11 Claims, 1 Drawing Figure

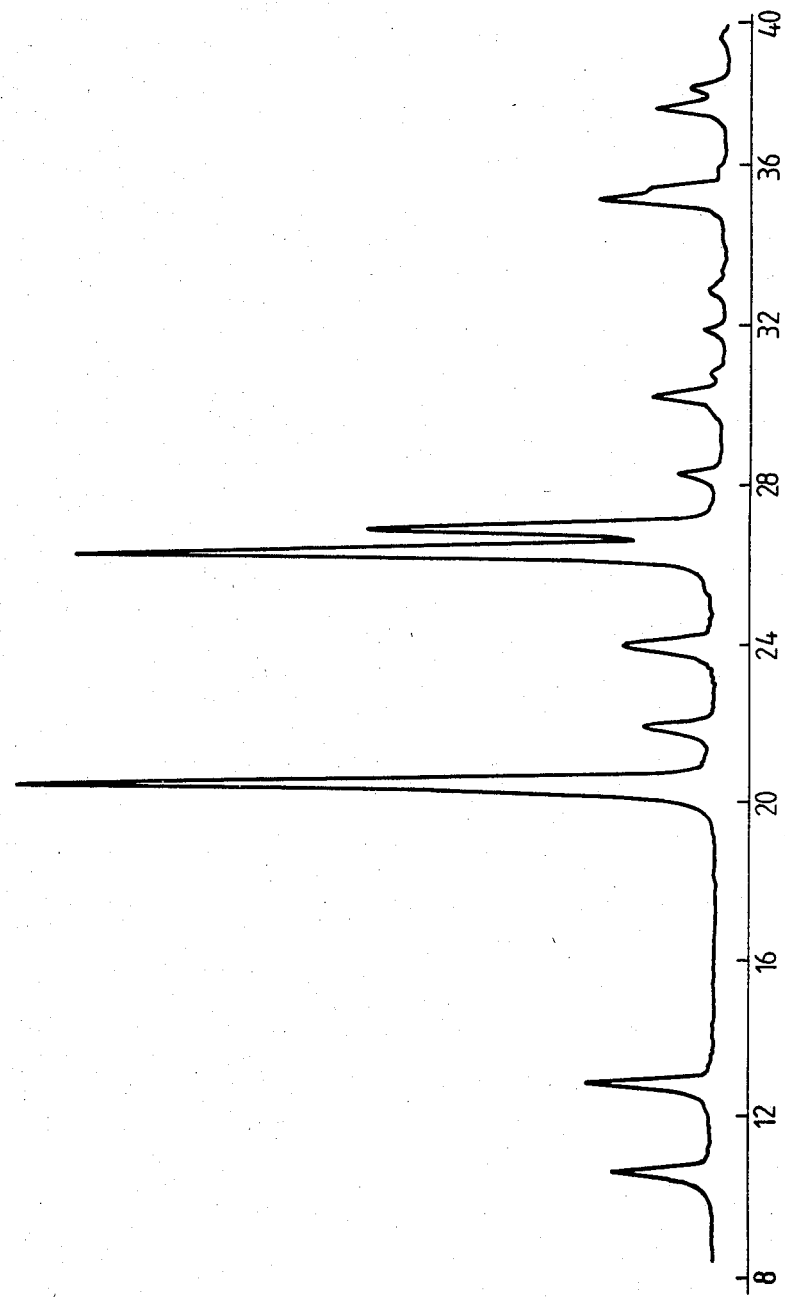
Fig.1. TYPICAL X-RAY POWDER DIFFRACTION PATTERN OF EU7

ZEOLITE EU-7

The present invention relates to a novel zeolite material, hereinafter referred to as EU-7, and to methods for its preparation.

Aluminosilicate zeolites are now widely used in industry. Some occur only in nature, others are only available as a result of chemical synthesis and some are available in both natural and synthetic forms. Synthetic zeolites are attracting more and more attention and it is becoming more and more possible to control the preparation of such zeolites so as to tailor their properties to particular needs.

According to the present invention a crystalline zeolite material, EU-7 has a composition (in terms of mole ratios of oxides) expressed by the formula:

0.5 to 2.5 $R_2O:Y_2O_3$:at least 20 $XO_2$:0 to 600 $H_2O$ wherein R is a monovalent cation or $1/n$ of a cation of valency n, X is silicon and/or germanium, Y is one or more of aluminum, iron, chromium, vanadium, molybdenum, arsenic, antimony, manganese, gallium or boron and $H_2O$ is water of hydration additional to water notionally present when R is H, and having an X-ray powder diffraction pattern substantially as set out in Table 1 (as determined by standard technique using copper Kα radiation) and as shown in FIG. 1. A preferred form of zeolite EU-7 has a composition expressed by the formula:

0.5 to 2.5 $R_2O:Y_2O_3$:20 to 5000 $XO_2$:0 to 600 $H_2O$ where R, X and Y have the meanings given hereinbefore.

TABLE 1

| As synthesised EU7 | | Calcined EU7 | |
|---|---|---|---|
| d(Å) | $I/I_o$ | d(Å) | $I/I_o$ |
| 7.96 | 12 | 7.98 | 11 |
| 6.66 | 15 | 6.66 | 17 |
| 4.23 | 100 | 4.24 | 100 |
| 3.97 | 11 | 3.97 | 9 |
| 3.65 | 9 | 3.65 | 13 |
| 3.44 | 2 | — | — |
| 3.33 | 98 | 3.33 | 91 |
| 3.26 | 51 | 3.27 | 49 |
| 3.12 | 7 | 3.12 | 6 |
| 2.915 | 10 | 2.915 | 10 |
| 2.868 | 1 | 2.868 | 2 |
| 2.770 | 3 | 2.772 | 2 |
| 2.691 | 1 | 2.685 | 3 |
| 2.522 | 20 | 2.522 | 17 |
| 2.502 | 13 | 2.507 | 11 |
| 2.475 | 1 | 2.475 | 2 |
| 2.370 | 10 | 2.373 | 10 |
| 2.344 | 5 | 2.345 | 5 |

This definition includes both freshly prepared EU-7 ("freshly prepared" means the product of synthesis and washing, with optional drying, as hereinafter described) and also forms of the zeolite resulting from dehydration and/or calcination and/or ion exchange. In freshly prepared EU-7, R may include an alkali metal cation, preferably caesium, and/or ammonium and hydrogen and may include nitrogen-containing organic compounds as described below. These organic components are hereinafter referred to, for inconvenience only, as A. The peak at d(Å) 4.23 sometimes exhibits a shoulder at d(Å) 4.30.

As EU-7 is a zeolite, the organic component(s) must be held within the zeolite framework. It (they) can be removed by thermal or oxidative degradation or by displacement by suitable small molecules. However reference to Table 1 will show that there are no significant differences between the X-ray diffraction patterns for as synthesised EU-7 and calcined EU-7 (the calcination was carried out at 500° C. for 16 hours). Calcination at 960° C. was also found to have no effect on the diffraction pattern and it is believed that the thermal stability of zeolite EU-7 is very high.

The nitrogen-containing organic material does not constitute part of the composition for the purposes of definition. Thus, a zeolite EU-7 as made typically has the molar composition:

0.5 to 2.5 $M_2O$:0 to 150 $A:Y_2O_3$:20 to 5000 $XO_2$:0 to 300 $H_2O$ where M is an alkali metal, preferably caesium, ammonium or hydrogen.

In calcined forms of zeolite EU-7, R may be any cation including hydrogen since the organic component is either burnt out in the presence of air, leaving hydrogen as the other balancing cation, or it is removed prior to calcination for example by dissolution in water or an organic solvent. The zeolite is readily converted to the hydrogen form by ion-exchange with hydrogen ions and/or with ammonium ions followed by calcination.

Zeolite EU-7 may be prepared by reacting an aqueous mixture containing sources of at least one oxide $XO_2$, at least one oxide $Y_2O_3$ and optionally at least one organic compound selected from (a) primary, secondary, tertiary and cyclic amines with 1 to 3 nitrogen atoms in the molecule and with a total of 1 to 10 carbon atoms per nitrogen atom:

(b) primary, secondary and tertiary alcohols with 1 to 3 hydroxyl groups in the molecule and with a total of 1 to 10 carbons per hydroxyl group;

(c) compounds containing both at least one amine group and at least one hydroxyl group in the molecule and with 1 to 10 carbon atoms per group; and (d) mixtures of compounds selected from groups (a), (b) and/or (c), the reaction mixture having the molar composition:

$XO_2/Y_2O_3$ in the range 20 to 5000, preferably 30 to 120
$M^1OH/XO_2$ in the range 0.08 to 0.7, preferably 0.15 to 0.50
$H_2O/XO_2$ in the range 5 to 170, preferably 15 to 85
$A/XO_2$ in the range 0 to 1 preferably 0.08 to 0.5
$M^2Z/XO_2$ in the range 0 to 1 preferably 0.08 to 0.33
wherein each of $M^1$ and $M^2$ represents an alkali metal, preferably caesium, ammonium or hydrogen, A represents the organic compound, X and Y have the meanings as hereinbefore defined, and Z represents an acid radical.

Preferred compounds of group (a) are α-ω alkane diamines having 1 to 4 carbon atoms per nitrogen atom for example hexane-1,6-diamine and more preferably butane-1,4-diamine and ethylene diamine.

Preferred compounds of group (b) are α-ω, alkane diols having 1 to 4 carbon atoms per hydroxyl group, for example ethylene glycol and hexane-1,6-diol.

A preferred organic compound for use in the preparation of EU-7 is butane-1,4-diamine. Experiments with other organic compounds, for example hexane-1,6-diamine, hexane-1,6-diol and piperazine have shown that impurities, especially cristobalite, tend to be formed along with zeolite EU-7. However, use of the smaller butane-1,4-diamine leads to a much purer EU-7 product with a much lower content of zeolite impurity. Optionally, organic components may be absent from the reaction mixture and this has the advantage that there is then no need to remove organic material from the zeolite.

Suitable alkali metals for use in the method of the invention include sodium, potassium, rubidium and caesium and of these it is preferred to use caesium. On occasion, however, it is preferred to use rubidium as the latter is more easily removed by ion exchange.

The X-ray diffraction pattern and other preliminary analysis suggest that zeolite EU-7 is a narrow pore zeolite. It seems probable therefore that the use of the relatively large caesium ions in the preparation of the zeolites leaves relatively little space for the organic mineraliser. Hence among the organic mineralisers so far tested, the relatively small molecules such as butane-1,4-diamine, appear to be the most suitable for use when caesium is used as alkali metal.

The preferred oxide $XO_2$ is silica ($SiO_2$) and the preferred oxide $Y_2O_3$ is alumina ($Al_2O_3$).

The silica source can be any of those commonly considered for use in synthesising zeolites, for example powdered solid silica, silicic acid, colloidal silica or dissolved silica. Among the powdered silicas usable are precipitated silica, especially those made by precipitation from an alkali metal silicate solution, such as the type known as "KS 300" made by AKZO, and similar products, aerosil silicas, fume silicas such as "CAB-O-SIL" M5 and silica gels suitable in grades for use in reinforcing pigments for rubber or silicone rubber. Colloidal silicas of various particle sizes may be used, for example 10 to 15 or 40 to 50 microns, as sold under the Registered Trade Marks "LUDOX", "NALCOAG" and "SYTON". The usable dissolved silicas include commercially available waterglass silicates containing 0.5 to 6.0, especially 2.0 to 4.0, moles of $SiO_2$ per mol of alkali metal oxide, "active" alkali metal silicates as defined in UK Pat. No. 1,193,254, and silicates made by dissolving silica in alkali metal hydroxide or quaternary ammonium hydroxide or a mixture thereof.

The alumina source is most conveniently a soluble aluminate, but aluminium, an aluminium salt, for example the chloride, nitrate, or sulphate, an aluminium alkoxide or alumina itself, which should preferably be in a hydrated or hydratable form such as colloidal alumina, pseudoboehmite, boehmite, gamma alumina or the alpha or beta trihydrate can alco be used.

The reaction mixture is conveniently reacted under autogeneous pressure, optionally with added gas, for example nitrogen, at a temperature in the range 80° to 250° C., more suitably 140° to 200° C., until crystals of zeolite EU-7 form, which can be from 1 hour to many months depending on the reactant composition and the operating temperature. Agitation is optional, but is preferable since it assists homogenisation of the reaction mixture and reduces the reaction time. Seeding of the reaction mixture with EU-7 crystals can also be advantageous if EU-7 crystals dispersed in their mother liquor are used.

At the end of the reaction, the solid phase is collected on a filter and washed and is then ready for further steps such as drying, calcination and ion-exchange.

Any alkali metal ions present in the product of the reaction have to be at least partly removed in order to prepare the catalytically active hydrogen form of EU-7 and this can be done by ion exchange with an acid, especially a strong mineral acid such as hydrochloric acid or by way of the ammonium compound made by ion exchange with a solution of an ammonium salt such as ammonium chloride. Ion exchange can be carried out by slurrying once or several times with the ion-exchange solution. The zeolite is usually calcined after ion exchange but this may be effected before ion-exchange or during ion-exchange if the latter is carried out in a number of stages. Ion exchange can also be used to replace ions present in the "as made" form of the zeolite by other ions and this ion-exchanged form of the zeolite can also be converted, if desired, to the hydrogen form as described above.

Organic material incorporated in the zeolite during the synthesis can be removed by heating at temperatures up to 1500° C. under atmospheric pressure or by heating at lower temperatures, under reduced pressure. Alternatively, organic material may be removed by dissolution in water or in a suitable organic solvent, if desired during ion-exchange.

Zeolite EU-7 finds use in ion-exchange, especially in nonaqueous solvents. It is also useful, especially in its hydrogen form, in sorption, especially of small molecules, for example in the sorption and separation of molecules found in air.

Zeolite EU-7 prepared by the method of the invention is also useful as a catalyst, for example as a hydrocarbon conversion catalyst and in the conversion of small oxygen-containing organic molecules to hydrocarbons. It may be employed using the general techniques described in the prior art for zeolite catalysis.

In the drawing, FIG. 1 shows a typical X-ray powder defraction pattern of EU-7.

The zeolite and its method of preparation are illustrated by the following Examples.

EXAMPLE 1

EU-b 7 was synthesised from the molar reaction mixture of composition:

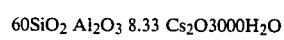

as follows:

An aluminate solution was prepared by dissolving 1.04 g of alumina trihydrate in a solution of 18.65 g of caesium hydroxide monohydrate dissolved in 15 g of distilled water in a beaker using a magnetic stirrer hot plate. This aluminate solution was then added to a mixture of 24.0 g CAB-O-SIL M5 silica, 7.88 g of hexane-1,6-diol and 300 g of water in a liter plastic beaker. An additional 42 g of water was used to rinse the aluminate solution from the beaker and was added to the reaction mixture. The mixture was stirred with a spatula until it appeared to be homogeneous.

The synthesis mixture was then placed in a stainless steel autoclave in which it was stirred at 300 r.p.m. and allowed to react at 180° C. Crystallisation was complete within 70 hours.

The zeolite was then filtered from the reaction mixture washed with distilled water and dried at 120° C. and in some cases, as specified, calcined at 550° C. for 16 hours.

EXAMPLES 2 to 6

The procedure of Example 1 was repeated using the reaction composition and conditions given in Table 2.

Analysis of the products of Examples 1 to 6 by X-ray powder diffraction showed that in each case a significant amount of impurity was formed as well as zeolite EU-7 (see Table 2). In Example 5 the first material to form was ferrierite which later converted to zeolite EU-7 and cristobalite.

TABLE 2

| Example | SiO$_2$ | Al$_2$O$_3$ | M$_2$O | H$_2$O | Organic (a) Component | Products |
|---|---|---|---|---|---|---|
| 1 | 60 | 1 | 8.33 (Cs) | 3000 | 10 HEXDL | EU-7 + Cristobalite |
| 2 | 60 | 1 | 8.33 (Cs) | 3000 | 20 PIPZE | EU-7 + Cristobalite |
| 3 | 60 | 1 | 10.8 (Cs) | 3000 | 10 HEXMD | EU-7 + Cristobalite |
| 4 | 60 | 2 | 10 (Cs) | 3000 | 20 HEXMD | EU-7 + Pollucite |
| 5 | 60 | 2 | 10 (Rb) | 3000 | 20 HEXMD | Ferrierite EU-7 + Cristobalite |
| 6 | 60 | 1 | 10 (Cs) | 3000 | 15 HEXMD | EU-7 + ZSM5 + trace Cristobalite |

(a) HEXDL = hexane-1,6-diol; PIPZE = piperazine; HEXMD = hexane-1,6-diamine.

EXAMPLES 7 to 10

Synthesis mixtures having the compositions shown in Table 3 were prepared as described for examples 1 to 6 except that the reaction temperature was 150° C. in Example 9. In this case, the products obtained using caesium as the alkali metal were very much purer than those obtained in Examples 1 to 6, thereby illustrating the advantage of using butane-1,4-diamine as the organic mineraliser.

In Example 8, rubidium was used as the alkali metal source. Rubidium is especially useful in the synthesis of zeolite Nu-10 (see our co-pending European Patent Application published as EPA No. 77624) and hence zeolite Nu-10 was formed along with zeolite EU-7. However the composition of the reaction mixture used was not the best for either zeolite and hence cristobalite was formed by default as the main product. It was also observed that the first material to form from this mixture was ferrierite.

The products of Examples 1 to 10 were identified by X-ray diffraction and it was found that in each case the diffraction pattern for zeolite EU-7 did not vary significantly from that given in Table 1 As in Examples 1 to 6 it was found that in each case a significant amount of an impurity was formed as well as zeolite EU-7.

TABLE 3

| Example | SiO$_2$ | Al$_2$O$_3$ | M$_2$O | H$_2$O | Organic (a) Component | Products |
|---|---|---|---|---|---|---|
| 7 | 60 | 1 | 10 (Cs) | 3000 | 20 BUTDM | Very crystalline EU-7 + trace Cristobalite |
| 8 | 60 | 1 | 10 (Rb) | 3000 | 20 BUTDM | Cristobalite + (Nu-10 + EU-7) as minor components |
| 9 | 60 | 1 | 10 (Cs) | 3000 | 20 BUTDM | Cristobalite EU-7 + Cristobalite + Kenyaite |
| 10 | 60 | 1 | 10 (Cs) | 3000 | 20 BUTDM | Very crystalline pure EU-7 |

(a) Butane-1,4-diamine

EXAMPLE 11

A portion of "as made" zeolite EU-7 prepared in Example 7 was calcined at 550° C. for 16 hours. It was then treated with IM hydrochloric acid at 75° C. for 2 hours using 1 g. of zeolite per 100 ml of solution. This ion-exchange procedure was repeated six times. Samples of the solid taken after each exchange were washed until free from chloride, dried at 110° C. for four hours and equilibrated with water vapour over saturated sodium chloride solution. The ion-exchange samples were then examined by X-ray powder diffraction.

It was found that there was a systematic increase in most but not all of the peak heights and there was no evidence at all of damage to the lattice. The increase in peak height is consistent with the removal of caesium ions (gram atomic absorption 46,100) from the lattice and their replacement by hydrogen ions (which have a much smaller gram atomic absorption). At least 6 ion-exchange cycles are required to remove all the exchangeable caesium ions from the lattice.

Samples of EU-7 from Examples 7 and 10 were analysed by X-ray fluoresence and the results are shown in Table 4. The total amount of material accounted for by the analysis is significantly below 100% and the difference is probably due to organic material which is not released until the sample is fused with lithium borate flux to form the glass disc used for the analysis. The empirical formulae given in Table 4 are based on the assumption that all the material which is not accounted for by the analysis is butane-1,4-diamine.

Electron micrographs of the sample from Example 7 show that in this case zeolite EU-7 crystals are rod shaped, 0.2 $\mu$ in cross-section and 1 to 4 $\mu$ long.

TABLE 4

| Sample | % SiO$_2$ | % Al$_2$O$_3$ | % Cs$_2$O | SiO$_2$/Al$_2$O$_3$ | Total a |
|---|---|---|---|---|---|
| Example 7 | 81.51 | 4.036 | 12.67 | 34.3 | 97.01 |
| Example 10 | 78.42 | 3.947 | 14.75 | 33.8 | 95.76 | a Total includes trace elements (Ca, Mg, Na, K, Fe, Ti, etc.)
Empirical formula of EU-7
Example 7 34.3 SiO$_2$Al$_2$O$_3$ 1.13 Cs$_2$O 0.86 BUTDM 2.09 H$_2$O
Example 10 33.8 SiO$_2$Al$_2$O$_3$ 1.35 Cs$_2$O 1.25 BUTDM 2.0 H$_2$O

EXAMPLES 12 to 17

Synthesis mixtures having the compositions shown in Table 5 were prepared as described for examples 1 to 6 except for some variations in reaction temperature, as shown. Example 12 is illustrative of the synthesis of EU-7 in the absence of an organic component. Examples 13, 14 and 15 show that ethylenediamine is preferable as the organic component to both octane-1,8-diamine and dodecane-1,2-diamine.

TABLE 3

| Example | SiO$_2$ | Al$_2$O$_3$ | M$_2$O | H$_2$O | Organic (a) Component | T/°C | Products |
|---|---|---|---|---|---|---|---|
| 12 | 60 | 1 | 10 (Cs) | 3000 | None | 180 | EU-7 + Cristobalite as minor component |
| 13 | 60 | 1 | 10 (Cs) | 3000 | 20 EDM | 180 | EU-7 + Cristobalite as minor component |
| 14 | 60 | 1 | 10 (Cs) | 3000 | 20 ODM | 180 | EU-7 + Cristobalite |
| 15 | 60 | 1 | 10 (Cs) | 3000 | 20 DDM | 180 | EU-7 + Cristobalite |
| 16 | 60 | 1 | 10 (Cs) | 3000 | 10 HEXDM | 150 | EU-7 + trace ZSM5 + trace Kenyaite |
| 17 | 60 | 0.75 | 10 (Cs) | 3000 | 15 HEXDM | 170 | EU-7 + trace Cristobalite + trace Kenyaite |

(a) EDM = ethylenediamine;
DDM = dodecane-1,2-diamine;
ODM = octane-1,8-diamine;
HEXDM = hexane-1,6-diamine.

We claim:

1. A crystalline zeolite material, EU-7, having a molar composition (in terms of mole ratios of oxides) expressed by the formula:

0.5 to 2.5 R$_2$O:Y$_2$O$_3$:at least 20 XO$_2$:0 to 600 H$_2$O wherein R is a monovalent cation or 1/n of a cation of valency n, X is silicon and/or germanium, Y is one or more aluminum, iron, chromium, vanadium, molybdenum, arsenic, antimony, manganese, gallium or boron, and H$_2$O is water of hydration additional to water notionally present when R is H, and having an X-ray powder diffraction pattern as set out in Table 1 (as determined by standard technique using copper Kα-radiation) and as shown in FIG. 1.

2. A crystalline zeolite material, EU-7, as claimed in claim 1 wherein the molar composition is expressed by the formula:

0.5 to 2.5 R$_2$O:Y$_2$O$_3$:20 to 5000 XO$_2$:0 to 600 H$_2$O.

3. A crystalline zeolite material, EU-7, as claimed in claim 1 wherein R is or includes an alkali metal cation, ammonium, hydrogen or a nitrogen-containing organic cation.

4. A crystalline zeolite material, EU-7, as claimed in claim 1 having, as freshly made, a molar composition expressed by the formula 0.5 to 2.5 M$_2$O:0 to 150A:Y$_2$O$_3$:20 to 5000 XO$_2$:0 to 300 H$_2$O where M is an alkali metal, selected from caesium and rubidium ammonium or hydrogen and A is nitrogen-containing organic cation.

5. A method of making the crystalline zeolite material, EU-7 as defined in claim 1, which comprises
  forming an aqueous mixture containing sources of at least one oxide XO$_2$, at least one oxide Y$_2$O$_3$ and optionally at least one organic compound selected from
  (a) cyclic amines with 1 to 3 nitrogen atoms in the molecule and with a total of 1 to 10 carbon atoms per nitrogen atom;
  (b) α-ω alkane diamines having 1 to 4 carbon atoms per nitrogen atom;
  (c) α-ω alkane diols having 1 to 4 carbon atoms per hydroxyl group; and
  (d) mixtures of compounds selected from groups (a), (b) and/or (c), the reaction mixture having the molar composition:
  XO$_2$/Y$_2$O$_3$ in the range 20 to 5000
  M$^1$OH/XO$_2$ in the range 0.08 to 0.7
  H$_2$O/XO$_2$ in the range 5 to 170
  A/XO$_2$ in the range 0 to 1
  M$^2$Z/XO$_2$ in the range 0 to 1
    wherein each of M$^1$ and M$^2$ represents an alkali metal selected from caesium and rubidium, ammonium or hydrogen, A represents the organic compound, X is selected from silicon and germanium, and Y is one or more of aluminum, iron, chromium, vanadium, molybdenum, arsenic, antimony, manganese, gallium or boron, and Z is an acid radical;
  maintaining the mixture at a temperature of 80°-250° C. until crystals of EU-7 form; and
  recovering EU-7 zeolite material.

6. A method as claimed in claim 5 wherein the reaction mixture has a molar composition in which
  XO$_2$/Y$_2$O$_3$ is in the range 30 to 120
  M$^1$OH/XO$_2$ is in the range 0.15 to 0.50
  H$_2$O/XO$_2$ is in the range 15 to 85
  A/XO$_2$ is in the range 0.08 to 0.5
  M$^2$Z/XO$_2$ is in the range 0.08 to 0.33.

7. A method as claimed in claim 5 in which the organic compound is selected from hexane-1,6-diamine, butane-1,4-diamine, ethylene diamine, hexane-1,6-diol and ethylene glycol.

8. A method as claimed in claim 5 in which M$^1$ and M$^2$ are caesium.

9. A catalyst comprising zeolite EU-7 as defined in claim 1.

10. A method of making crystalline zeolite material, EU-7, as defined in claim 1 which comprises
  forming an aqueous mixture containing sources of at least one oxide XO$_2$, at least one oxide Y$_2$O$_3$, optionally a diamine selected from butane-1,4-diamine; ethylene-diamine; octane-1, 8-diamine; dodecane-1, 2-diamine; and hexane-1, 6-diamine, the reaction mixture having the molar composition:
  XO$_2$/Y$_2$O$_3$ in the range 20 to 5000, preferably 30 to 120
  M$^1$OH/XO$_2$ in the range 0.08 to 0.7, preferably 0.15 to 0.50
  H$_2$O/XO$_2$ in the range 5 to 170, preferably 15 to 85
  A/XO$_2$ in the range 0 to 1
  M$^2$Z/XO$_2$ in the range 0 to 1, preferably 0.08 to 0.33 wherein $M^1$ and $M^2$ is an alkali metal selected from caesium or rubidium, A represents the diamine, X is one or more of silicon and germanium, and Y is one or more of aluminum, iron, chromium, vanadium, molybdenum, arsenic, antimony, manganese, gallium and boron, and Z is an acid radical;

maintaining the mixture at a temperature of 80°-250° C. until crystals of EU-7 form; and recovering EU-7 zeolite material.

11. A method of making crystalline zeolite material, EU-7, as defined in claim 1, which comprises reacting at 150° to 180° C., an aqueous mixture containing sources of $SiO_2$ and $Al_2O_3$, a diamine selected from butane-1, 4-diamine; ethylene-diamine; octane-1, 8-diamine; dodecane-1, 2-diamine; and hexane-1, 6-diamine, the reaction mixture having the molar composition:

$SiO_2/Al_2O_3$ from 30 to 80
$H_2O/SiO_2$ of about 50:1
$A/SiO_2$ from 0.16 to 0.33
$M_2O/SiO_2$ 0.14 to 0.18 wherein $M_2$ is caesium and/or rubidium and A is the diamine whereby crystals of zeolite EU-7 are formed and, recovering EU-7 zeolite material.

* * * * *